(No Model.)

A. N. AYRES.
UTENSIL FOR COOKING FOOD OVER LAMP CHIMNEYS.

No. 517,561. Patented Apr. 3, 1894.

Witnesses.
Lauritz N. Möller.
William W. Lummus.

Inventor
Augusta N. Ayres.
by Alban Andrew her atty.

THE NATIONAL LITHOGRAPHING COMPANY,
WASHINGTON, D. C.

UNITED STATES PATENT OFFICE.

AUGUSTA N. AYRES, OF BEVERLY, MASSACHUSETTS.

UTENSIL FOR COOKING FOOD OVER LAMP-CHIMNEYS.

SPECIFICATION forming part of Letters Patent No. 517,561, dated April 3, 1894.

Application filed July 27, 1893. Serial No. 481,680. (No model.)

*To all whom it may concern:*

Be it known that I, AUGUSTA N. AYRES, a citizen of the United States, and a resident of Beverly, in the county of Essex and State of Massachusetts, have invented new and useful Improvements in Cooking Utensils, of which the following, taken in connection with the accompanying drawings, is a specification.

This invention relates to improvements in cooking utensils adapted to be temporarily attached to a lamp chimney of any well known form or construction, and adapted to support any small vessel containing the food, &c., to be cooked or heated.

The invention is also applicable for the purpose of holding curling tongs in position while being heated by the flame from the lamp.

The invention is carried out as follows reference being had to the accompanying drawings, wherein—

Figure 1:
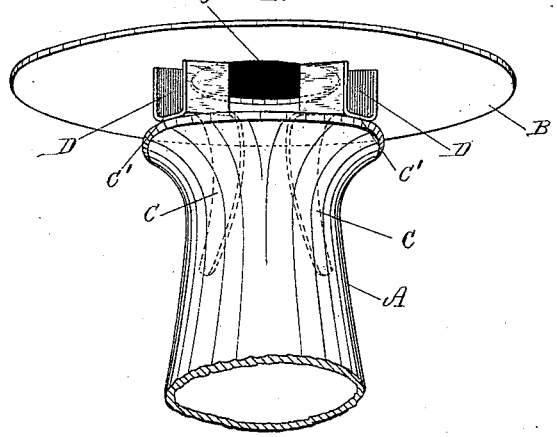
Figure 2:
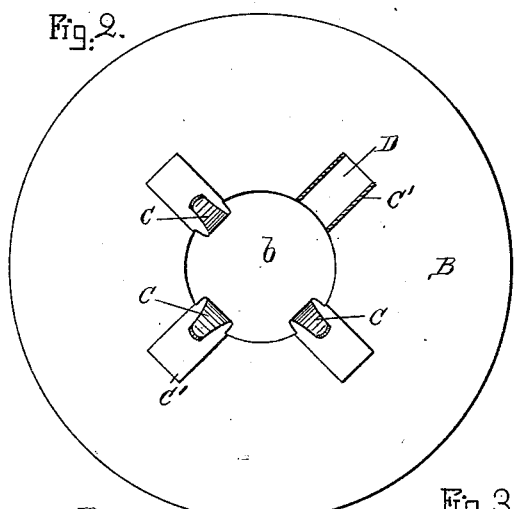
Figure 3:
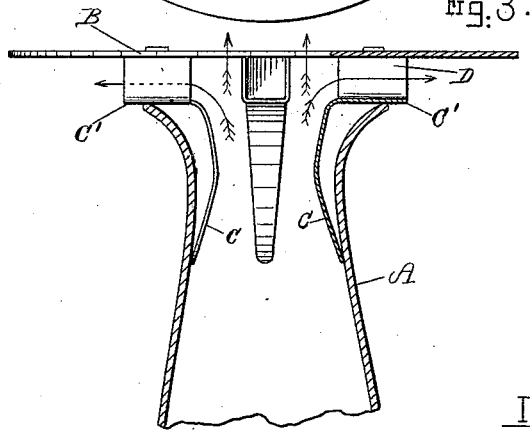

Figure 1 represents a perspective view of the device shown in position as attached to the top of a lamp chimney. Fig. 2 represents a bottom plan view of the same partly shown in section; and Fig. 3 represents a partial side elevation and longitudinal section.

Similar letters refer to similar parts wherever they occur on the different parts of the drawings.

A represents a lamp chimney of any suitable form, size, or shape, such chimney may be smooth, cylindrical or flaring in its upper end without invalidating the utility of my invention, which is applicable to any of the ordinary or well known forms of chimneys whether used on gas or oil lamps.

My improved heating or cooking utensil consists of a top plate B made of metal and provided with a central draft opening $b$ as shown in the drawings; said plate B may in addition to its central perforation be provided with a series of perforations if so desired without departing from the essence of my invention.

C, C represent expansive or yielding metal prongs, of which I preferably use three or more; said prongs are secured in their upper ends in a suitable manner to the plate B and their lower expansive ends are adapted to be inserted into the upper end of the glass chimney A and to be temporarily retained therein by being expanded against the interior of said chimney as shown in Fig. 3. The upper portion of each prong C terminates as a ⌊⌋ shaped draft and supporting piece C' attached to the plate B, and between such portion C' and the under side of the plate B is formed a lateral channel D which serves in part for the escape of the heated products from the lamp chimney. Said pieces C', C' also serve as supports for the device against the upper edge of the chimney so as to hold the plate B slightly elevated above said chimney so as not to obstruct the draft and proper combustion. The channels D, D also serve to hold curling tongs while being heated and are very useful for such purpose as a person need not hold such tool in the hand while heating it, but may insert such tool in one of said channels and allow it to remain therein until properly heated.

The device is very simple, practical and portable and can be firmly attached to a lamp chimney whenever desired for use for cooking foods or liquids in the nursery, sick-room, or for other purposes to which it may be applicable.

In using the device the cup or other vessel containing the food or liquid to be heated is supported on top of the plate B.

Having thus described the nature, construction, and operation of my invention, I wish to secure by Letters Patent and claim—

The herein described cooking or heating utensil consisting of a plate B having a draft opening $b$ combined with expansive prongs C, C adapted to enter the chimney and having ⌊⌋ shaped supporting pieces C', C' in their upper ends secured to the plate B and adapted to serve as means for holding said plate B at a proper distance above the chimney top as well as providing draft passages and retaining device for curling tongs, substantially as and for the purpose set forth.

In testimony whereof I have signed my name to this specification, in the presence of two subscribing witnesses, on this 25th day of July, A. D. 1893.

AUGUSTA N. AYRES.

Witnesses:
ALBAN ANDRÉN,
KARL A. ANDRÉN.